(12) United States Patent
Ruland

(10) Patent No.: US 8,474,208 B2
(45) Date of Patent: Jul. 2, 2013

(54) FLOOR PANEL CONTAINING A POLYMER AND CORK

(75) Inventor: Carl Ruland, Bonn (DE)

(73) Assignee: Novalis Holdings Limited, Wanchai (HK)

(*) Notice: Subject to any disclaimer, the term of this patent is extended or adjusted under 35 U.S.C. 154(b) by 299 days.

(21) Appl. No.: 12/819,595

(22) Filed: Jun. 21, 2010

(65) Prior Publication Data

US 2010/0319282 A1    Dec. 23, 2010

Related U.S. Application Data

(60) Provisional application No. 61/219,108, filed on Jun. 22, 2009.

(51) Int. Cl.
*B32B 9/06* (2006.01)
*B32B 9/00* (2006.01)
*B32B 23/00* (2006.01)

(52) U.S. Cl.
USPC ........ 52/390; 52/311.1; 428/40.1; 428/195.1; 428/42.1; 428/455; 428/326

(58) Field of Classification Search
USPC ............. 52/384–394, 311.1–316.1; 428/40.1, 428/195.1, 138, 455, 220, 326, 332, 42.1, 428/322, 337
See application file for complete search history.

(56) References Cited

U.S. PATENT DOCUMENTS

| 4,347,272 | A | 8/1982 | Schmidt | |
|---|---|---|---|---|
| 7,897,002 | B2 * | 3/2011 | Bober et al. | 156/237 |
| 2003/0134074 | A1 * | 7/2003 | Scolaro et al. | 428/40.1 |
| 2003/0152734 | A1 * | 8/2003 | Scolaro et al. | 428/40.1 |
| 2004/0121123 | A1 * | 6/2004 | Bober et al. | 428/138 |
| 2004/0170793 | A1 * | 9/2004 | Linden et al. | 428/40.1 |
| 2005/0079780 | A1 * | 4/2005 | Rowe et al. | 442/33 |
| 2007/0286982 | A1 * | 12/2007 | Higgins et al. | 428/95 |

FOREIGN PATENT DOCUMENTS

| JP | 9-151596 | 6/1997 |
|---|---|---|
| NL | 1038042 C * | 12/2011 |

* cited by examiner

*Primary Examiner* — Jeanette E. Chapman
(74) *Attorney, Agent, or Firm* — Barley Snyder

(57) ABSTRACT

A vinyl floor panel for a flooring system prepared from a blend of a polymer and cork granules. The floor panel includes top and bottom surfaces with a first layer between both surfaces. A printed pattern is located on the top surface. The first layer is prepared from a blend of a polymer polyvinyl chloride and cork granules, where the cork granules are evenly distributed with the polyvinyl chloride throughout the length, width, and thickness of the first layer.

16 Claims, 6 Drawing Sheets

FLOOR PANEL CONTAINING A POLYMER AND CORK

CROSS-REFERENCE TO RELATED APPLICATIONS

This application is a non-provisional application converted from and claiming the benefit of the filing date under 35 U.S.C. §119(e) of Provisional Patent Application No. 61/219,108, filed Jun. 22, 2009.

FIELD OF THE INVENTION

The present invention relates to a floor panel for a flooring system and more particularly to a floor panel for a flooring system prepared from a blend of polymers and cork granules.

BACKGROUND

Floor panels are an excellent option for a flooring system, providing an excellent balance between cost, durability, and resiliency.

Vinyl flooring is typically manufactured in sheets or rectangular/square panels. Each sheet or panel sometimes utilizes an adhesive (on the underside) or a connection element, such as a tongue and groove system on the edges, to connect multiple sheets/panels together. Once assembled and secured together, a surface area having any size or shape may be covered.

Since polyvinyl chloride is a material having high density and weight, vinyl flooring having sole or a majority composition of polyvinyl chloride produces several negative properties including, but not limited to: (1) high thermal conductivity, (2) lower resiliency, (3) high rigidity, and (4) limiting noise reduction. As a result, vinyl flooring is often prepared from laminates that incorporate layers of different materials or layers of the same material having different compositions.

Cork, as an alternative flooring surface, and more specifically as a layer to vinyl flooring is well known. Cork layering provides vinyl flooring with many favorable properties, including feeling, improved resiliency, impermeability, as well as inherent low thermal conductivity, low density and good energy absorption.

U.S. Pat. No. 4,347,272, as illustrated in FIGS. 1-3, describes wall tiles 10 made from a mass of cork granules 12 dispersed and bonded together in a matrix of polyvinyl chloride resin. More specifically, each wall tile 10 is shown having a first layer 14 made of the cork composition of this invention that, and overlaid with a second layer 16 of any desired pressure sensitive adhesive. After the adhesive application step, adhesive layer 16 may be overlaid with a commercially available peel-sheet layer 18, to protect the adhesive until time of use. Such a construction of material 10 may not only be used for wall tiles, but, since it is flexible, it may be used to cover curved surfaces such as lamp bases, waste baskets, drinking glasses or cups to insulate them, or any other desired use of the sheet-like structure 10.

Additionally, Japanese Patent Application JP 199503126331995 1130, as illustrated in FIG. 4, describes an economically low priced flooring incorporating wooden powder with laminated layers, including a resin layer, an adhesive bond, a cork layer and a transparent surface layer. As a result, the described flooring provides excellent durability without having to compromise cushioning. More specifically, the vinyl chloride resin layer 1 (having 50-2000 kg/cm), the adhesive bond 2, the cork layer 3 and the transparent surface layer 4 are subsequently laminated. The resin layer 1 is formed of vinyl chloride resin having 600-1300 degree of average degree of polymerization, a plasticizer of 30-120 pts.wt. at per 100 pts.wt. of resin and wooden powder having 50-200 pts.wt. It has 2-20 mm in thickness. The cork layer 3 is formed of natural cork or compressed cork, and is 0.3-3 mm in thickness.

In each of the aforementioned patents, products with a separate homogenous cork layer is described. The cork layer has been added to improve either surface aesthetics or overall material properties. Additionally, there are known products that incorporate a composition of blended recycled cork with rubber. However, the advantageous properties of cork have not been fully exploited in the use of vinyl tiles, as such that the vinyl tile fully makes use of cork particulate.

SUMMARY

The present invention was devised in light of the problems described above, by providing a vinyl floor panel for a flooring system which is prepared from a blend of a polymer and cork granules through the length, width, and thickness of the vinyl layer. Accordingly, vinyl flooring prepared from a laminate having a vinyl layer with cork granules distributed throughout proves quite effective.

The floor panel having improved material properties, includes a top and bottom surface, and a first layer prepared from a blend of a polymer and cork granules. The first layer includes cork granules evenly distributed with polyvinyl chloride throughout the length, width, and thickness of the first layer.

BRIEF DESCRIPTION OF THE DRAWINGS

The invention will be explained in greater detail with reference to embodiments, referring to the appended drawings, in which.

DETAILED DESCRIPTION OF THE EMBODIMENT(S)

Figure 2:
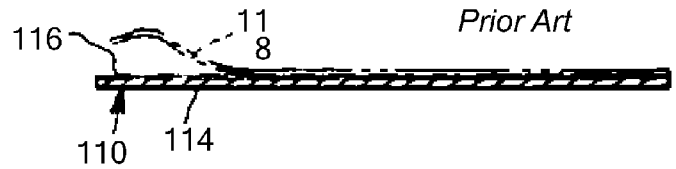
FIG. 2 is a side view of the known wall tile prepared from cork granules.
Figure 1:
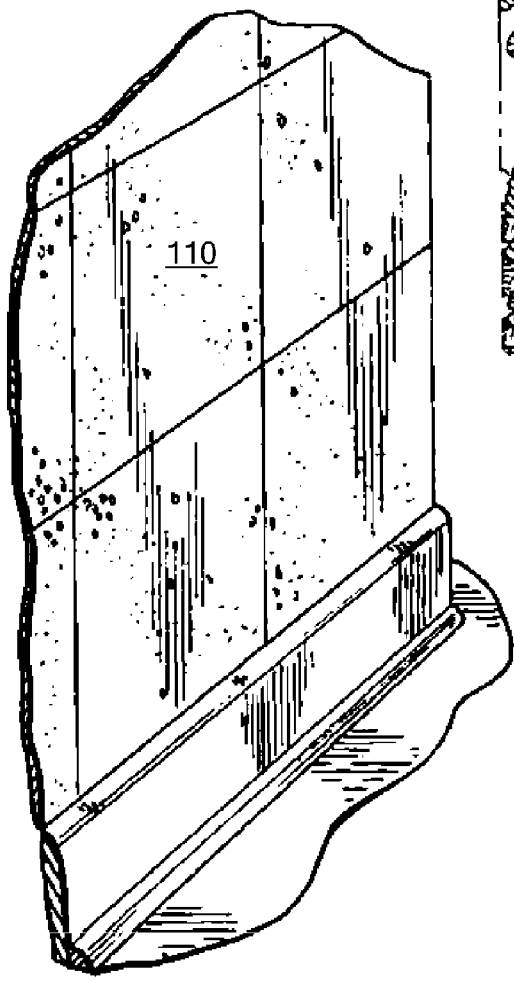
FIG. 1 is a perspective view of known wall tile prepared from cork granules.
Figure 3:
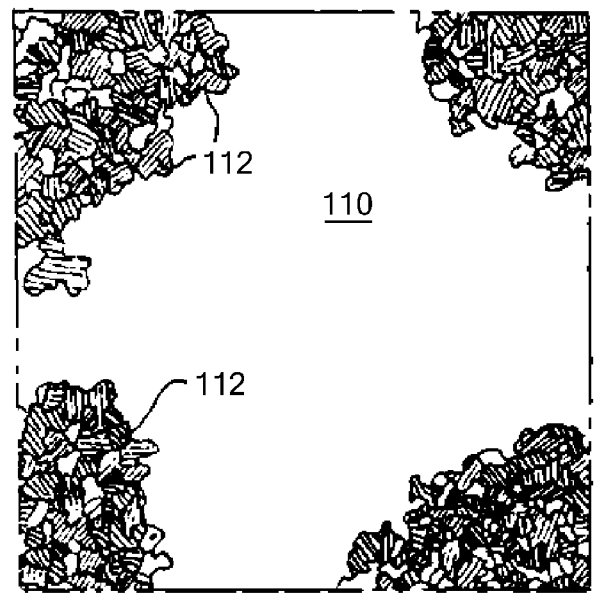
FIG. 3 is a top view of the known wall tile prepared from cork granules.
Figure 4:
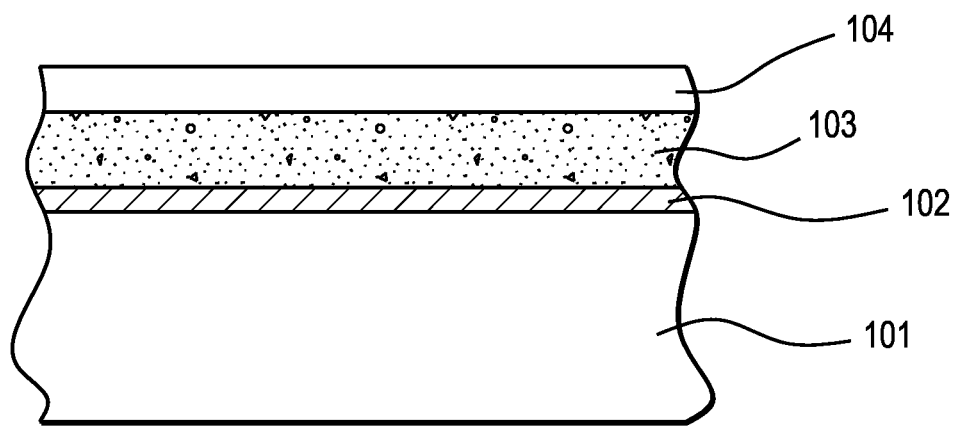
FIG. 4 is a sectional view of a known floor panel prepared using a single layer of cork granules.

Referring now to the drawings, in which like numerals refer to like parts throughout the several views and embodiments.

Figure 5:
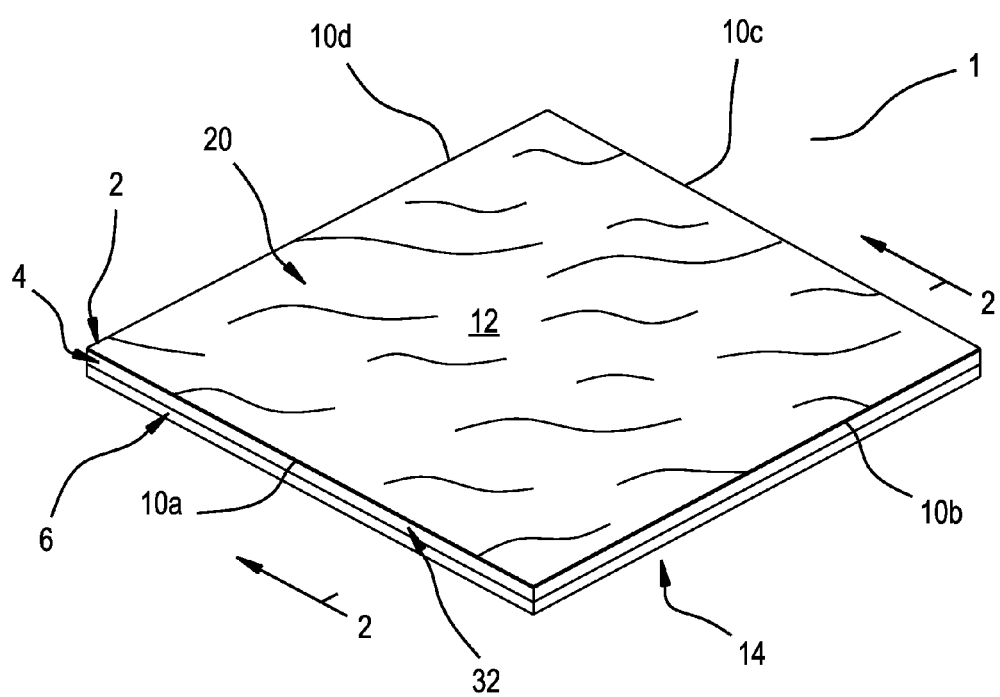
FIG. 5 is perspective view of a floor panel according to the invention.
Figure 6:
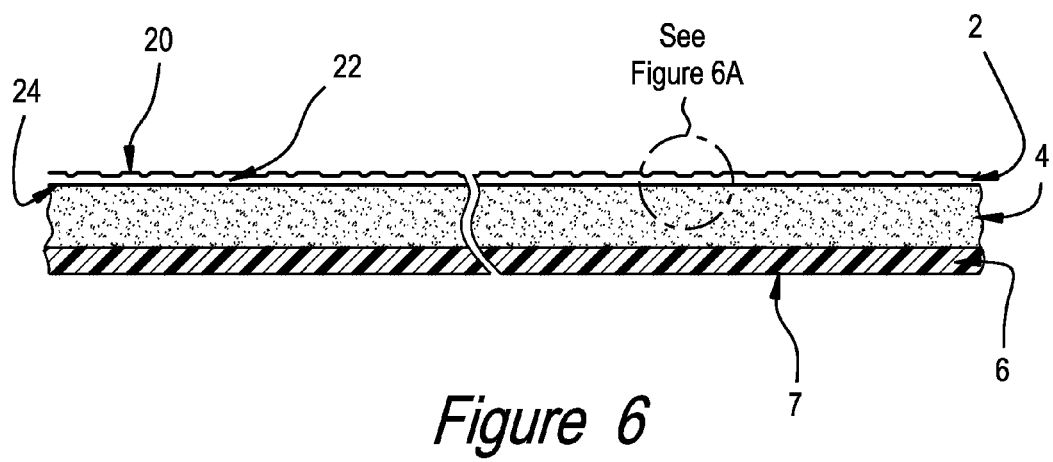
FIG. 6 is sectional view of the floor panel according to the invention, cut along line 2-2 of FIG. 5.

In the embodiment shown in FIGS. 5 and 6, a single floor panel 1 is prepared from laminated polymeric components. Each floor panel 1 is prepared from laminated polymeric components, including vinyl, forming several layers. The total thickness of each floor panel, in the embodiments shown is approximately 4-6 mm. However, it is also possible to prepare the floor panel 1 having one or more layers, with each layer having differing thickness. The composition of the floor panel 1 may vary as well, with the floor panel 1 being prepared from various materials, including but not limited to polymers, ceramics, metals, organic materials, etc.

However, as illustrated in FIGS. 5 and 6, the floor panel 1 is prepared as a laminate having a top layer 2 of flexible polymeric sheet material, a middle layer 4 of flexible polymeric material incorporating cork granules 32, and a bottom layer 6 prepared from a more rigid polymeric material. Each of the layers 2, 4, and 6 have different thickness, as shown. However, it is possible to have layers of equal thicknesses. The thickness, layering, and overall floor panel 1 preparation would accord to preferences of the finished product, including dimensions. The manufacturing is not held to one specific design, but rather incorporates the novel design features described in the following paragraphs.

According to the invention, the floor panel 1, which can be shaped as either a square or rectangle, has four sides 10a, 10b, 10c, 10d, wherein each side is connected by interior angles of 90° (right angles). Additionally, the floor panel 1 includes a top side 12 and a bottom side 14. In the embodiment shown, the top side 12 is prepared from the top layer 2 and the bottom side 14 is prepared using the bottom layer 6.

Figure 6A:
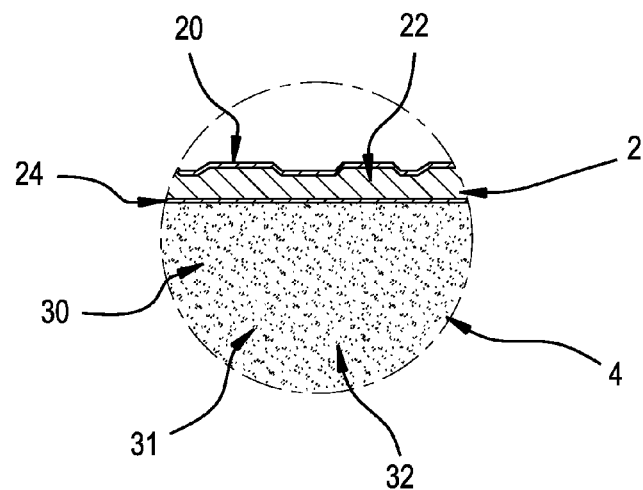
FIG. 6A is an exploded view of the floor panel according to the invention.

As shown in FIGS. 5, 6 and 6A, the floor panel is prepared from various laminate components. In the embodiment shown, the top layer 2 is prepared having three components: a thin coating layer 20, a durable wear layer 22 and an ornamental layer 24, with the ornamental layer having printed features. Any of the component pieces, such as the thin coating layer 20, the durable wear layer 22 or the ornamental layer 24, may be textured in order to enhance features of the floor panel 1 construction.

The thin coating layer 20 and the durable wear layer 22 are provided on top of the ornamental layer 24, and in the embodiment shown, the thin coating layer 20 and the durable wear layer 22 are translucent, being prepared from a plastic material having high durability.

In the embodiment shown, the ornamental layer 24 is provided having a printed pattern, with the underside of the ornamental layer 24 being bonded to the middle layer 4 and the printed pattern facing away from the bottom layer 6. The top layer 2 provides graphics and texture relief, and can be prepared to match any print or even mimic genuine metamorphic rock features.

The thin coating layer 20, although not necessary, would be a polyurethane coating having a thickness around 0.02 mm. However, it would be possible to vary the application, composition, and thickness of the thin coating layer 20 in regard to overall floor panel 1 construction.

The top layer 2 further includes a transparent wear layer 22, in the embodiment shown. The wear layer 22 would be prepared from polyvinyl chloride or other polymeric material, such as polypropylene. The wear layer 22 is utilized to protect the ornamental layer 24. And since the wear layer 22 is transparent or clear, then any aesthetic print on the ornamental layer 24 would be visible through the wear layer 22. Although the thickness may vary, the wear layer 22 would range from 0.1-1.0 mm. However, much like the coating layer 20, the application, composition, and thickness of the wear layer 22 may be prepared according to overall floor panel 1 construction The ornamental layer 24 can be used to provide the floor panel 1 with printed graphics, which would be used to enhance the aesthetics of the floor panel 1. Additionally, the ornamental layer 24 may provide material properties that neither the top or bottom layers 2, 8 may provide, based on material composition. In the embodiment, the ornamental layer 24 would be a decorative layer having a printed design on a top surface of the ornamental layer 24. The thickness of the ornamental layer 24 can be vary. However, in the embodiment shown, the ornamental layer 24 is prepared having a thickness around 0.08 mm. Although the top layer 2 is positioned on top of the middle layer 4, the top layer 2 is transparent allowing any printed pattern on the top surface of the middle layer 4 to be easily seen.

If the ornamental layer 22 is the top most layer of the floor panel, then the ornamental layer 22 should be prepared from material having higher resistant and resilient properties, than if the ornamental layer 22 is prepared with a top wear layer 20.

During manufacturing, the top most layer 2, either solely the ornamental layer 24 or a combination of the thin coating layer 20, the durable wear layer 22 or the ornamental layer 24, may be prepared with textured features to enhance the feel of the floor panel 1. Therefore, if the top layer 2 is prepared with a printed pattern and a textured surface, the floor panel 1 will have a presentation and feel of genuine ceramic or metamorphic rock flooring.

The bottom layer 6, which is optional as well, is prepared from a single layer of high density plastic. The bottom layer 6 functions as a backing layer. Further, the bottom layer 6 will maintain connection with adjacent floor panels or existing floor boards. Therefore, the floor panel will include a fastening source, which may be an pre-applied adhesive 7 prepared on the underside of the bottom layer 6. Alternatively, the fastening source may be a locking system on the sides 10a, 10b, 10c, and 10d of the floor panel, which may allow connection of several floor panels 1 to be a floating installation. However, in order to focus on the invention, only the adhesive 7 is shown, while the locking system has been omitted.

Additionally, the bottom layer 6 may be provided to balance the top layer 2, essentially averting warping of the floor panel 1. Although the bottom layer 6 thicknesses may vary, it is appropriate to provide the bottom layer 6 having a thickness ranging from 0.3-2.5 mm. The bottom layer 6 could be prepared from a variety of materials, including but not limited to polyvinyl chloride, polypropylene, polyolefin, etc. The composition would depend on the intended application of the floor panel 1.

According to the invention, the middle layer 4 is prepared from a homogenous blend of polyvinyl chloride (resin) 30 and cork particles 32. In the embodiment shown, the middle layer 4 connects with the top layer 2 and the bottom layer 6.

Since the middle layer 4 is a homogenous blend of polyvinyl chloride 30 (having high density) and cork particles 32, the floor panel 1 achieves better thermal conductivity, resiliency, and noise reduction properties. The thickness of the middle layer 4 may vary. However, in the embodiment shown, the middle layer 4 is prepared having a thickness ranging from 1.5-2.7 mm.

In preparing the middle layer 4, the polyvinyl chloride 30 and the cork particles 32 are first mixed as a dry blend. The source of the polyvinyl chloride 30 and cork particles 32 can be prepared from virgin, post industrial or post consumer recycling material. The composition of the dry blend, for example, maybe, 100 parts polyvinyl chloride 30 and 15-150 parts cork particles 32. The cork particles 32 may have a thickness of 0.03-0.3 mm and a water content of less than 3% before a 40-120 part plasticizer 31 is added to the dry blend. The plasticizer 31 is added to the dry blend in order to improve physical properties (e.g., flexibility, heat resistance, resiliency, and durability) of the middle layer 4.

The blend of polyvinyl chloride (resin) 30, cork particles 32, and plasticizer 31 is heated, and a homogenous vinyl foam is produced. As a result, the cork particles 32 are distributed through the length, width and thickness of the middle layer 4. This prepared middle layer 4 is then appropriately placed between already prepared top and bottom layers 2, 6 in order to form the floor panel 1.

In the embodiment shown, the floor panel 1 is prepared using a known hot press manufacturing process. The durable wear layer 22 and an ornamental layer 24 may be pre-bonded before the layers 2, 4 and 6 are appropriately positioned on top of each other and then bonded together using heat and pressure. The thin coating layer 20, if applicable, would be layered after the layers 2, 4 and 6 were bonded, creating a top coat to the constructed floor panel 1.

As a result of the construction, he laminated vinyl floor panel 1 according to the invention would most notable include the material properties of cork. The cork particles 32 are dispersed through the entirety of the middle layer 4, including a length, width and thickness of the middle layer 4. Since the middle layer 4 thickness and quantity of cork particle 32 used may vary, the floor panel 1 may be adjusted to have a variety of material properties.

Figure 7:
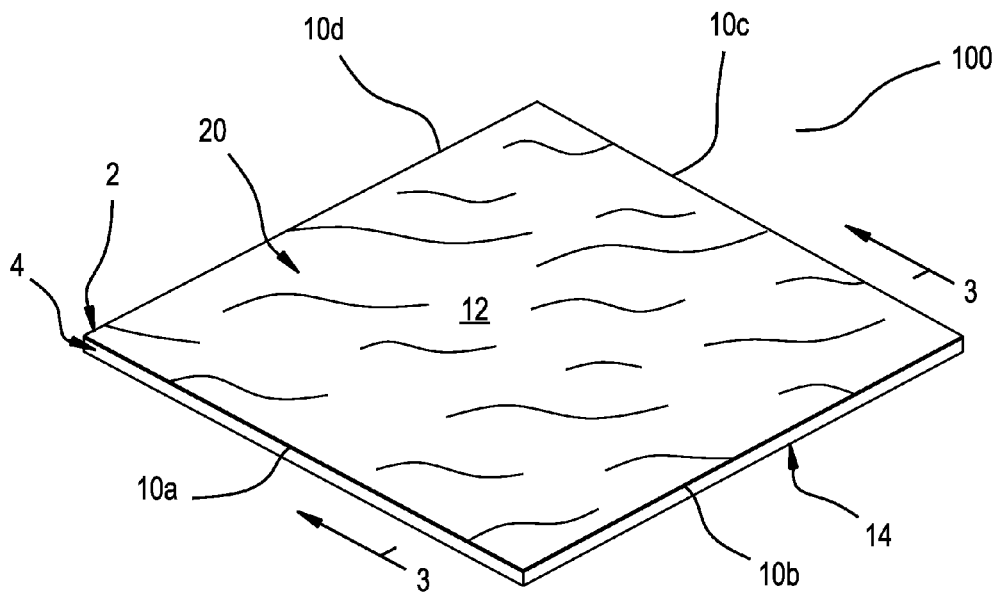
FIG. 7 is a perspective view of a second embodiment of the floor panel according to the invention.
Figure 8:
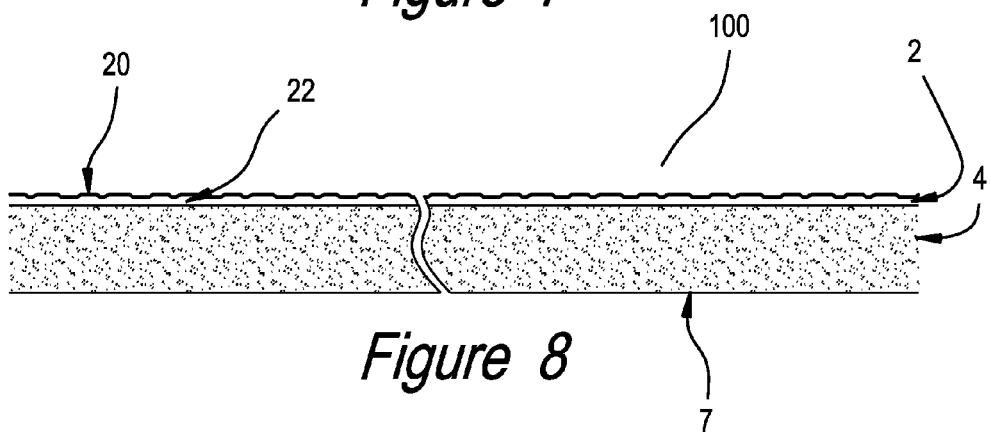
FIG. 8 is sectional view of the second embodiment of the floor panel according to the invention, cut along line 3-3 of FIG. 7.
Figure 10:
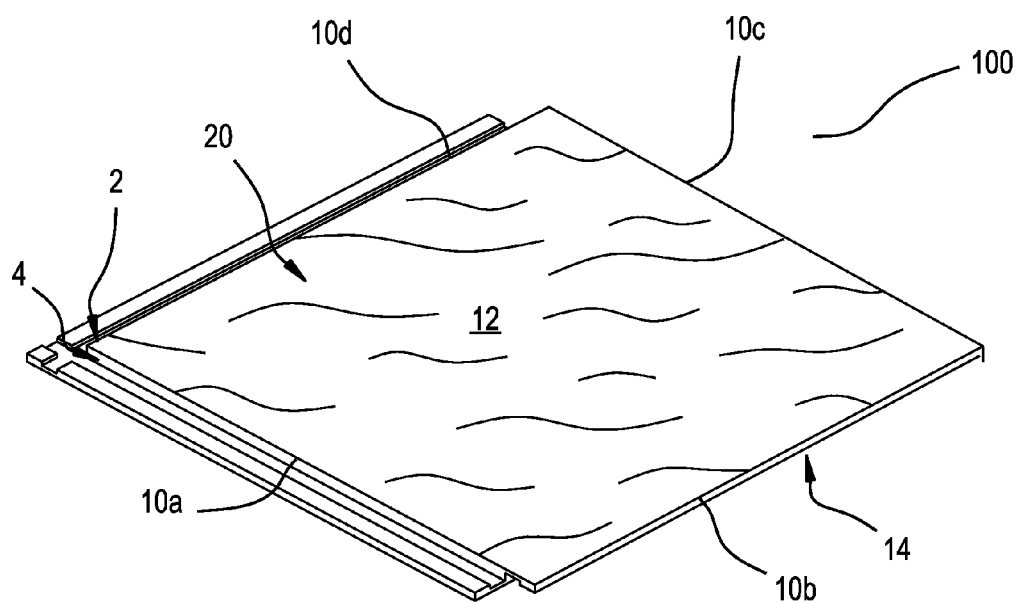
FIG. 10 is a perspective view of a fourth embodiment of the floor panel according to the invention.

FIGS. 7 and 8 illustrate a second embodiment of the floor panel, according to the invention. As shown, a floor panel 100 is prepared from only the top layer 2 and the middle layer 4, described above. The bottom layer 6, which was described above as optional, has been removed. Therefore, the floor panel 100 will either include an adhesive 7 prepared on the under side of the middle layer 4 or a locking system (see FIG. 10) on the sides 10a, 10b, 10c, and 10d of the floor panel 100.

Figure 9:
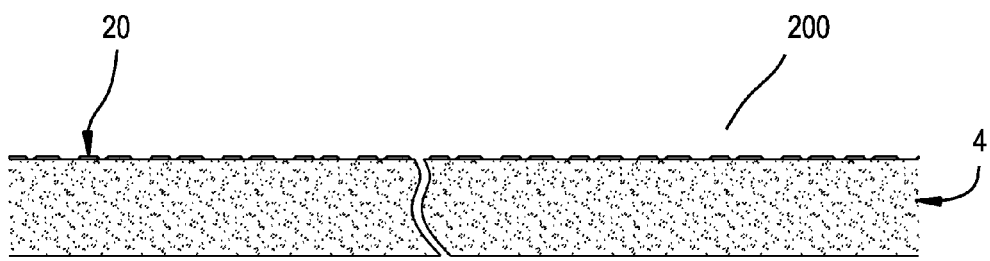
FIG. 9 is sectional view of a third embodiment of the floor panel according to the invention, cut along line 3-3 of FIG. 7.

In a third embodiment, as shown in FIG. 9, a floor panel 200 is prepared entirely from the middle layer 4, and therefore, the floor panel 200 will have cork particles 32 distributed throughout the entire floor panel 200. As a result, the printed pattern and textured relief would have to be applied to the middle layer 4, using the same techniques as described above. In order to seal the floor panel 200, the thin coating layer 20 may be applied to the top surface of the middle layer 4.

Although the layering and dimensions of the floor panel 1 are a matter of choice, a suitable thickness for the top layer 2, the middle layer 4 and the bottom layer 6 can be for example, 4-6 mm.

The foregoing illustrates some of the possibilities for practicing the invention. Many other embodiments are possible within the scope and spirit of the invention. Therefore, it is intended that the foregoing description be regarded as illustrative rather than limiting.

What is claimed is:

1. A floor panel, comprising:
a top and bottom surface, the top surface having a printable pattern;
a first layer prepared from a blend of a polymer and cork granules, the cork granules evenly distributed with polyvinyl chloride through the length, width, and thickness of the first layer; and
a second layer of flexible polymeric material and a third layer prepared from a rigid polymeric material, the second and third layers positioned on opposite surfaces of the first layer.

2. The floor panel according to claim 1, wherein the blend is a homogenous blend.

3. The floor panel according to claim 1, wherein the polymer is polyvinyl chloride.

4. The floor panel according to claim 3, wherein the polyvinyl chloride is a resin.

5. The floor panel according to claim 1, wherein the cork granules have a thickness of about 0.03-0.3 mm.

6. The floor panel according to claim 1, wherein the first layer is a composition of about 100 parts of polyvinyl chloride and about 15-150 parts of cork granules.

7. The floor panel according to claim 6, wherein the first layer further includes about 40-120 parts of plasticizer.

8. The floor panel according to claim 5, wherein the first layer thickness is about 1.5-2.7 mm.

9. The floor panel according to claim 1, wherein the second layer includes a thin coating layer, a durable wear layer and an ornamental layer having printed features.

10. The floor panel according to claim 9, wherein the thin coating layer, the durable wear layer or the ornamental layer is textured.

11. The floor panel according to claim 9, wherein the ornamental layer is positioned on the surface of the first layer, the printed features facing away from the third layer.

12. The floor panel according to claim 1, wherein third layer is a uniform layer of high density plastic.

13. The floor panel according to claim 1, wherein the bottom layer includes a fastening source that maintains connection between the floor panel and an adjacent floor panel or a surface of a floor.

14. The floor panel according to claim 1, further comprising a fastening source.

15. The floor panel according to claim 14, wherein the fastening source is a pre-applied adhesive.

16. The floor panel according to claim 14, wherein the fastening source is a locking system.

* * * * *